United States Patent [19]

Lawrence et al.

[11] Patent Number: 5,033,010
[45] Date of Patent: Jul. 16, 1991

[54] TURBINE ENGINE MONITORING SYSTEM

[75] Inventors: Trevor Lawrence, Coldfield, England; Edward N. Denaci, San Diego; William H. Conn, LaMesa, both of Calif.

[73] Assignee: Sundstrand Corporation, Rockford, Ill.

[21] Appl. No.: 277,099

[22] Filed: Nov. 29, 1988

[30] Foreign Application Priority Data

Nov. 16, 1988 [GB] United Kingdom ............... 8826804

[51] Int. Cl.$^5$ .......................................... G06F 15/20
[52] U.S. Cl. .............................. 364/550; 346/33 TP; 364/424.04; 374/102
[58] Field of Search .................. 364/424.04, 431.04, 364/550, 551.01, 557, 424.03; 374/102; 346/33 TP

[56] References Cited

U.S. PATENT DOCUMENTS

| | | | |
|---|---|---|---|
| 3,237,448 | 3/1966 | Howell et al. | 364/550 X |
| 3,362,217 | 1/1968 | Evans et al. | 364/550 X |
| 3,946,364 | 3/1976 | Codomo et al. | 374/102 X |
| 4,418,392 | 11/1983 | Hata | 364/571.01 |
| 4,523,286 | 6/1985 | Koga et al. | 364/494 |
| 4,575,803 | 3/1986 | Moore | 364/550 X |
| 4,677,558 | 6/1987 | Bohmler et al. | 364/431.04 |
| 4,707,796 | 11/1987 | Calabro et al. | 364/551.01 X |
| 4,787,053 | 11/1988 | Moore | 364/551.01 |

FOREIGN PATENT DOCUMENTS

| | | |
|---|---|---|
| 3410675 | 10/1985 | Fed. Rep. of Germany . |
| 2115316 | 9/1983 | United Kingdom . |
| 2115317 | 9/1983 | United Kingdom . |
| 2116748 | 9/1983 | United Kingdom . |

Primary Examiner—Parshotam S. Lall
Assistant Examiner—Edward R. Cosimano
Attorney, Agent, or Firm—William Lanyi

[57] ABSTRACT

A turbine engine monitoring system is provided which disposes a data storage device in permanent association with an engine being monitored. The data storage device comprises an electrically erasable programmable read-only memory which is contained in an enclosure and permanently attached to the engine. A connection link is provided to connect the memory device in signal communication with an external device, such as an engine control unit. The engine control unit is connected in signal communication with a plurality of transducers that enable the engine control unit to monitor the operational status of a plurality of parameters relating to the turbine engine. By permanently attaching the data storage device to the turbine engine, a lifetime information of the turbine engine can be maintained in permanent association with the turbine engine regardless of replacement of the turbine engine or its related engine control unit.

15 Claims, 6 Drawing Sheets

TURBINE ENGINE MONITORING SYSTEM

BACKGROUND OF THE INVENTION

1. Field of the Invention

The present invention is related generally to an engine monitoring system and, more specifically, to means for maintaining an operational history of a turbine engine during its lifetime in a way which is insensitive to the separation of the turbine engine from related monitoring equipment during the operational lifetime of the engine.

2. Description of the Related Art

It is known by those skilled in the art to use microprocessors or microcomputers in conjunction with the control of engines. For example, U.S. Pat. No. 4,677,558, which issued to Bohmler et al on June 30, 1987, describes a method and system for controlling the operation of an apparatus or engine, particularly an internal combustion engine. The Bohmler et al patent describes a system which permits the change of data, to be used in a fixed program carried out by a microprocessor in accordance with a stored program, upon the change in operating characteristics of a controlled apparatus such as an internal combustion engine. The system uses an erasable programmable read-only memory which is external to the microprocessor. This external memory forms a combined address and data memory having at least one address field and a vector field. A constant data field and a table, or function data field, are part of the external memory and the data fields contain data to be addressed directly through the address field or via the vector field for not only a single type or series of apparatus, such as internal combustion engines, but also additional engines or engine characteristics. For example, the data can be changed to account for engine aging. In order to run the program by the microprocessor, with a changed or aged engine, it is only necessary to change the address of the data in the data field and/or the vector field to provide different output data for any given programming step. The Bohmler et al patent does not anticipate the transfer of information from the microprocessor to an erasable programmable read-only memory during the operation of the engine. In fact, the Bohmler et al patent specifically describes the off-line data changing methodology when engine related parameters change. In addition, the Bohmler et al patent does not describe the erasable programmable read-only memory as being attached to the engine.

U.S. Pat. No. 4,523,286, which issued to Koga et al on June 11, 1985, describes an apparatus for making diagnosis of a valve device in a turbine system. The Koga et al patent describes a diagnostic apparatus for performing a diagnosis of a valve device in a turbine system which comprises at least one of a pressure sensor for sensing hydraulic pressure in a hydraulic cylinder for driving a valve body of the valve device and a position sensor for sensing the displacement of the valve body. The system also comprises a processing device for processing the output signal from the above mentioned sensors. The processing device has an offset computing device which receives a signal representing the actual operating state of the valve device obtained on the basis of the output signal from the sensor and a signal corresponding to a reference value obtained from the normal operating state of the valve device. The offset computing device is operable to compute the offset between the signals received. A judging device is provided for judging as to whether or not there is a symptom of a sticking of the valve device in accordance with an output signal from the offset computing device.

German patent DE 3410675 C1, which issued to Hafner et al, describes a processor control system for an engine which utilizes a processor having the engine operating parameters stored in a memory device which is fitted to the engine. The Hafner et al patent describes a system in which particular operating details for an internal combustion engine are incorporated into a read-only memory which is applied to the side of the internal combustion engine on a thermally insulating mounting. The program can be divided between separate read-only memories and applied to different parts of the engine. The internal combustion engine is controlled by a standard processor unit which is provided with electrical power by the normal engine battery. The processor is linked to the engine data storage and provides an optimum control system for the engine and its accessories. The stated advantage of the invention described in the Hafner et al patent is that a universal processor can be used in conjunction with individual read-only memories wherein the individual read-only memories provide necessary modifications that are applicable to each type of engine. The Hafner et al patent describes a system which attaches a read-only memory to an internal combustion engine for the purpose of providing a unidirectional data transfer from the read-only memory to the motor controller. It does not describe or suggest the on-line storage of historic engine operating parameters in the read-only memory for maintaining a lifetime history of the internal combustion engine. In fact, it specifically describes the memory as a read-only memory and not as a programmable read-only memory or an electrically erasable programmable read-only memory.

For the purpose of maintaining a lifetime turbine operations log for the turbine engine, it is desirable to provide a means by which information can be stored in a manner which is permanently associated with the engine being monitored regardless of whether or not the engine is separated from its control unit or the vehicle, such as an aircraft, with which it is originally associated. While the prior art describes several systems in which engine related information is stored prior to engine operation for purposes of maintaining a source of engine parameters, none of the prior art patents described above teaches the concept of providing a means for storing historical data relating to the operation of the engine in such a way that the stored data can be changed during the on-line operation of the engine.

SUMMARY OF THE INVENTION

It is advantageous to monitor the operation of gas turbine engines used in auxiliary power units, or APU's, over their entire operational lifetime. The recording of operational data for these gas turbine engines has typically been achieved through the use of dedicated meters and counters. Because of the inherent costs and overhead associated with the use of individual meters and counters for each unique function, the number of individual parameters that can be monitored in this way has been limited to only those parameters which are extremely critical for maintenance purposes. In a typical application, three or four meters or counters are used to monitor the number of times that the engine is started, the accumulated hours of engine operation, the number of times that the engine is started under emergency start conditions and a life cycle indicator.

With the recent development and increased use of full authority electronic control units for the control of gas turbine engines, the amount of data monitored and available to both the user and the manufacturer of the turbine engine has increased dramatically in the recent past. Electronic controllers are designed with built-in nonvolatile memory that is used to record on-line information relating to operational, historical and fault data for the gas turbine engine that is being controlled by the electronic controller. Because of the extreme temperature conditions that exist in the immediate environment of the turbine engine, the electronic controller is typically not part of the engine assembly. Instead, the electronic controller, or engine control unit, is spatially displaced from the turbine engine to protect it from the occasionally extreme temperatures associated with the region immediately surrounding the turbine engine. The extreme temperatures associated with the turbine engine could otherwise result in detrimental effects on the reliability of the electronic components contained in the electronic controller. Therefore, the electronic controller is generally configured as a separate line replaceable unit, or LRU, which is located remotely from the turbine engine and connected to the turbine engine by a wiring harness Since both the electronic controller and the engine assembly are separate line replaceable units, or LRU's, it is likely that if a fault develops in either the electronic controller assembly or the turbine engine, the faulty unit will be interchanged with a new replacement unit while the other line replaceable unit remains in place. Therefore, the turbine engine and the electronic controller do not necessarily remain as a matched pair of components during the entire lifetime of the turbine engine Since both the electronic controller and the turbine engine of the auxiliary power unit are line replaceable units and, therefore, can be individually replaced without a corresponding replacement of the other line replaceable unit, lifetime data relating to the turbine engine which is stored in the memory of the electronic controller will necessarily be separated from the turbine engine when either of the line replaceable units is replaced. This creates a severe problem. For example, if the turbine engine of the auxiliary power unit is replaced by a new turbine engine, the memory contained in the electronic controller will relate to the replaced turbine engine and not the new turbine engine Therefore, during the next operation of the auxiliary power unit, the electronic controller will begin to accumulate lifetime data on the new turbine engine within the memory that already contains significant lifetime data on the replaced turbine engine. This is clearly an undesirable result. Similarly, if the electronic controller is replaced and a new electronic controller is used with the existing turbine engine of the auxiliary power unit, all existing lifetime information relating to the turbine engine will be lost because of the fact that previous lifetime operational data will be removed with the replaced electronic controller. It should therefore be apparent that a significant advantage can be achieved by providing a turbine engine monitoring system which always maintains the lifetime data of a turbine engine in a data storage device that is inseparable from the turbine engine being monitored. If this were done, either the turbine engine or the electronic controller could be individually replaced without a corresponding separation of the lifetime data from the turbine engine.

If a data storage device is maintained in permanent association with a turbine engine, a new electronic controller can be used to replace a faulty electronic controller and the new controller can begin to monitor data and continue the accumulation of that lifetime data within the memory device which is permanently associated with the turbine engine. Similarly, if a new turbine engine is used to replace a faulty turbine engine, that new turbine engine could be installed in association with an existing electronic controller and all subsequent operational data collected by the electronic controller could be stored in the new data memory device that is permanently associated with the new turbine engine.

To accomplish the desirable results described above, the present invention provides an engine monitoring system that comprises a means for storing data which is permanently attached to the engine. In addition, the present invention provides a means for connecting the storing means in signal communication with an external device, such as an electronic controller, for the purpose of receiving information from the external device relating to the operation of the engine and storing that information in the storing means. The connecting means is connected in signal communication with the storing means to achieve these purposes. The external device, such as the electronic controller, can be connected in signal communication with the connecting means, with the connecting means providing a communication link between the external device and the storing means for the purpose of transmitting information relating to the operation of the engine from the external device to the storing means. The information stored in the storing means is obtained from one or more means for measuring operating parameters of the engine which are connected in signal communication with the external device. The connecting means used to connect the storing means in signal communication with the external device can be either a serial or a parallel communication link. Furthermore, the storing means can be an electrically erasable programmable read-only memory, or EEPROM. In a preferred embodiment of the present invention, the external device is an engine control unit, or ECU. The external device, in a preferred embodiment of the present invention, comprises a controller that is programmed to deactivate the storing means when the external device is neither transmitting signals to the storing means nor receiving signals from the storing means. Furthermore, in a preferred embodiment of the present invention, the external device comprises a controller that is programmed to determine the acceptability of the environmental conditions of the storing means prior to connecting the storing means to a source of power. The present invention is specifically intended for use in association with a turbine engine that is part of an auxiliary power unit, or APU, of an aircraft.

Although the present invention is specifically intended to store operational data that is monitored by the engine control unit during the operation of the turbine engine over its lifetime, the storing means can also be used to store data relating to the identity of its associated turbine engine and information relating to the specific identification and configuration of the turbine engine. However, most of the storage capacity of the storing means is intended for use to maintain a lifetime record of the turbine engine. That lifetime record includes information relating to fault conditions and the magnitudes of monitored parameters during those fault conditions. In addition, information is stored relating to the number of starts of the engine, the hours of operation and accumulated information relating to over temperature and over pressure conditions which occur during the operation of the turbine engine. Additionally, operating parameters can be monitored and stored for the purpose of statistically predicting the requirement of maintenance procedures prior to the actual occurrence of severe fault conditions. These statistical predictions can be based on historical information relating to the number of starts that the engine has experienced, the trend of required starting durations or an accumulated total of minutes over which the engine has been exposed to over temperature conditions.

BRIEF DESCRIPTION OF THE DRAWING

The preferred embodiment of the present invention will be more fully understood from a reading of the description of the preferred embodiment in conjunction with the drawing, in which.

DESCRIPTION OF THE PREFERRED EMBODIMENT

The present invention relates generally to engine monitoring systems and, more particularly, to an engine monitoring system which provides a means for storing lifetime data relating to the operation of a turbine engine in a manner which maintains a continuing and uninterrupted correlation between the stored data and the turbine engine.

Figure 1:
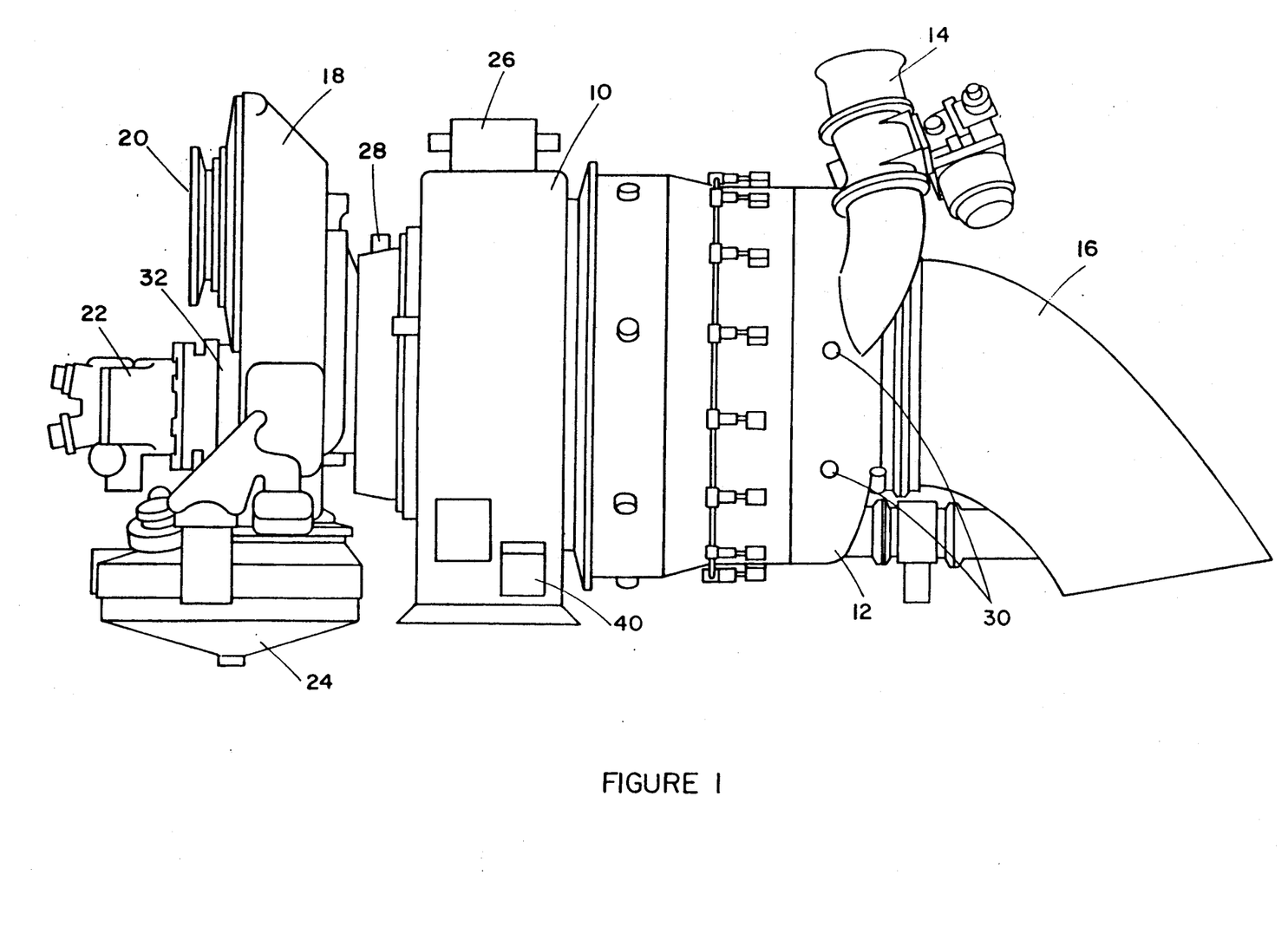
FIG. 1 illustrates an exemplary auxiliary power unit which includes a turbine engine.

Although the present invention can be used in association with many different types of engines, FIG. 1 specifically shows a turbine engine associated with other components to provide an auxiliary power unit. The turbine engine of the auxiliary power unit shown in FIG. 1 includes an inlet housing 10 which is connected to a combustor portion 12 of the turbine engine A conduit 14 provides an outlet for bleed air from the turbine engine and an exhaust duct 16 provides a passage for the exhaust of the turbine engine. Connected to the turbine engine is a gear box 18 which has one or more accessory pads 20 associated with it. In addition, the auxiliary power unit, or APU, is provided with a starter 22 and an oil sump 24. An exciter 26 is used to provide a means for igniting combustible gases in the combustor 12.

A plurality of transducers is provided to monitor the operation conditions of the auxiliary power unit. It should be understood that, depending on the particular application of the monitoring system, the plurality of transducers can be located virtually anywhere in association with the turbine engine and the auxiliary power unit. However, for the purpose of this description, several exemplary locations of the transducers will be described. For example, a speed monitoring device 28 is used to determine the rotational speed of the main shaft of the auxiliary power unit. This speed monitoring unit 28 can be a magnetic pickup device or another appropriate component that is capable of measuring the rotational speed of the main shaft. Furthermore, a plurality of thermocouples 30 can be provided at several locations on the structure of the auxiliary power unit to monitor temperatures at these predetermined critical locations. At appropriate locations, transducers can be used to measure the fuel pressure. For example, at the location indicated generally by reference numeral 32, a pressure transducer can be disposed for this purpose. In addition to the plurality of transducers associated directly with the turbine engine and related components, several additional transducers can be used to measure conditions in the region surrounding the auxiliary power unit. For example, transducers can be used to measure ambient pressure and ambient temperature. Also, in a preferred embodiment of the present invention, additional transducers can be used to monitor operational data relating to the aircraft on which the auxiliary power unit is used. For example, the speed and altitude of the aircraft can be simultaneously monitored.

The engine monitoring system of the present invention includes a storing means that is permanently attached to the turbine engine. In FIG. 1, this storing means is indicated by reference numeral 40. In a preferred embodiment of the present invention, the storing means comprises a box-like structure in which a solid state memory device is contained along with related electronic components, such as diodes, resistors, capacitors and transient voltage clamping components.

Throughout the description of the preferred embodiment, the storing means will be described as being permanently mounted on the turbine engine. For purposes of this description, this should be understood to mean that, under normal circumstances, the storing means is not removable from the structure of the turbine engine. Although it is realized that virtually any technique used to mount the storing means to the turbine engine can be reversed to separate these two components, this terminology shall be used to describe a mounting means which does not permit the storing means to be easily dismantled from the structure of the turbine engine. It should also be understood that, within the scope of the present invention, the storing means can be bolted directly to a portion of the turbine engine or, alternatively, rigidly attached to a bracket for ease of assembly. Notwithstanding the fact that virtually any technique used to attach the storing means 40 to the turbine engine is subject to a corresponding disassembling technique, the description of the preferred embodiment of the present invention should be understood to mean that the storing means 40 is intended to remain permanently in connection with the turbine engine regardless of the fact that the turbine engine may be removed from its originally associated aircraft and placed in another aircraft with a different engine control unit than that with which it was associated in the former aircraft. In other words, the storing means 40 is intended to travel continuously with the turbine engine regardless of the disposition of the turbine engine and regardless of the specific engine control unit or aircraft with which the turbine engine is later associated.

Figure 2:
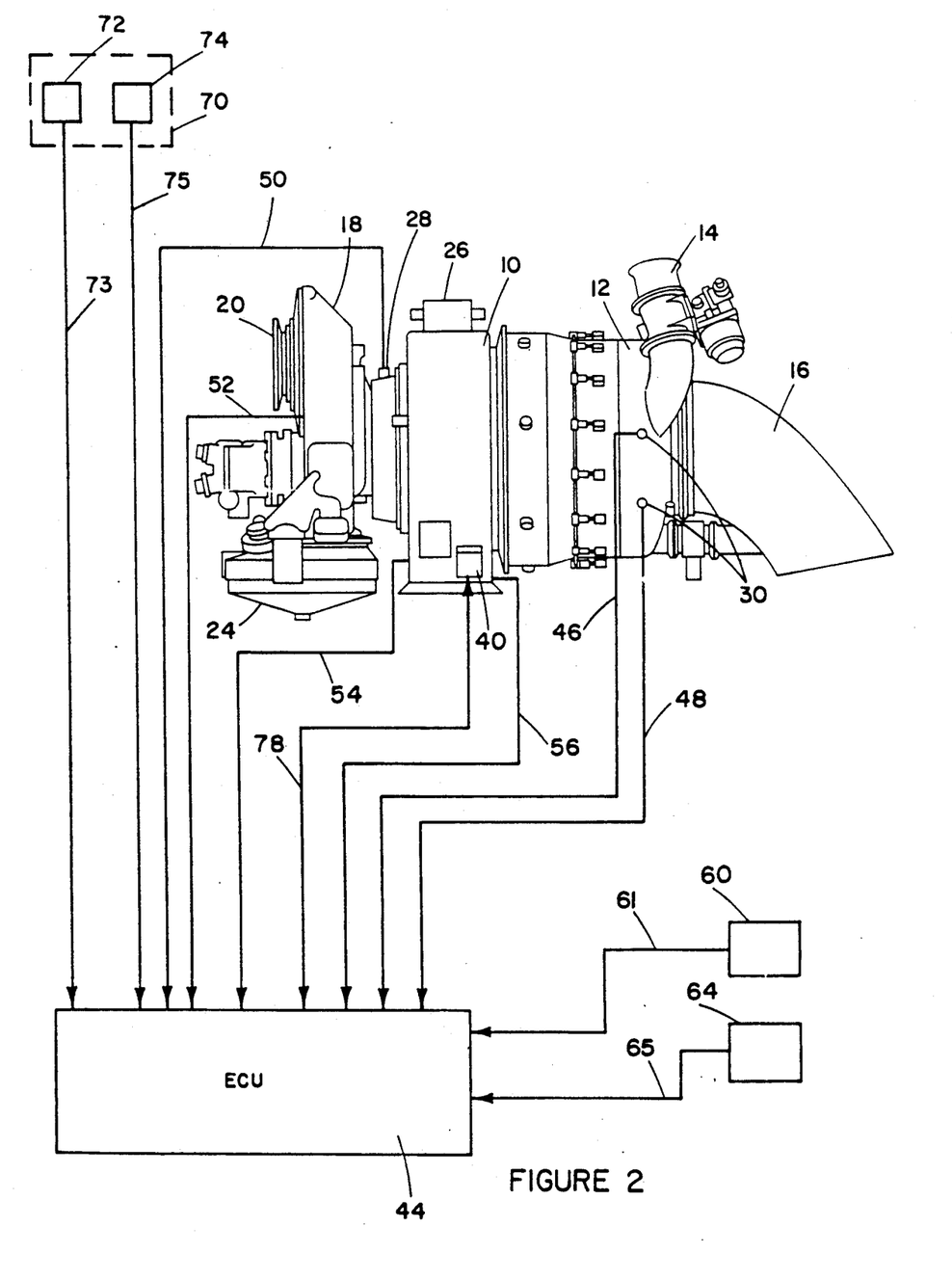
FIG. 2 schematically shows a turbine engine of an auxiliary power unit connected in signal communication with an engine control unit having a plurality of transducers connected in signal communication thereto.

FIG. 2 schematically shows the auxiliary power unit of FIG. 1 associated with an engine control unit 44. The connections between the engine control unit 44 and the plurality of transducers are shown schematically. For example, connection lines 46 and 48 connect the thermocouples 30 in signal communication with the engine control unit 44. They provide data corresponding to the temperatures at predetermined locations of the combustor 12. Signal line 50 connects the speed pickup 28 with the engine control unit 44 to provide information relating to the rotational speed of the main shaft of the auxiliary power unit. Signal line 52 provides information to the engine control unit 44 relating to the fuel pressure Signal line 54 is illustrative of a signal line which connects a pressure transducer within the inlet housing 10 to the engine control unit 44 and signal line 56 illustrates a connection between the engine control unit 44 and a temperature transducer, such as a thermocouple which is disposed at a position within the inlet housing 10. Signal lines 54 and 56 therefore provide information relating to the temperature and pressure of the air flowing into the inlet of the turbine engine. Boxes 60 and 64 schematically represent transducers used to measure ambient conditions in the region surrounding, but not in physical contact with, the turbine engine. These boxes are connected to the engine control unit 44 by signal lines 61 and 65, respectively.

In FIG. 2, the engine control unit 44 is shown to be spatially displaced from the auxiliary power unit and turbine engine. In many applications, the engine control unit 44 is intentionally disposed at a location in the aircraft that is remote from the turbine engine. The reason for this spatial displacement is to protect the engine control unit 44 from the potentially severe environment which surrounds the area immediately proximate the turbine engine. The distance between the engine control unit 44 and the turbine engine which it controls can vary from as little as a few feet to a significant distance with the engine control unit 44 being disposed at a location within the aircraft that is a significant distance away from the turbine engine.

As described above, the subject invention also is suitable for providing a means for storing information relating to the operation of the aircraft on which the auxiliary power unit is utilized. In FIG. 2, the dashed box 70 schematically represents the collection of one or more transducers which measure parameters relating to the operation of the aircraft. For example, boxes 72 and 74 represent exemplary transducers which monitor aircraft parameters. Transducer 72 could hypothetically monitor air speed and provide that information to the engine control unit 44 on signal line 73. Similarly, transducer 74 could provide a measurement of altitude and transmit that information, on signal line 75, to the engine control unit 44.

Although FIG. 2 is schematic for purposes of illustration, it illustrates that the subject invention is applicable for use with an engine monitoring system which includes an external device, or engine control unit 44, which is connectable to and spatially displaced from a means for storing information 40. The storing means 40 is connected in signal communication with the engine control unit 44, by signal line 78, so that bi-directional information transfer can occur between the storing means 40 and the engine control unit 44. As also shown in FIG. 2, the storing means 44 is permanently attached to the turbine engine. Therefore, it should be apparent that both the turbine engine and the storing means 40 are spatially displaced from the engine control unit 44. Furthermore, the storing means 40 is permanently associated with the turbine engine and permits the auxiliary power unit and the engine control unit 44 to be separated from each other without requiring that the storing means 40 and the data contained therein be separated from the turbine engine.

In the illustration, the storing means 40 is connected to the inlet chamber 10 of the turbine engine. It has been determined that, in many applications, it is significantly advantageous to dispose the storing means at a location on the turbine engine that provides the best protection from the extremely high temperatures that some other portions of the turbine engine reach. Since the inlet chamber 10 is used to direct the incoming air into the turbine, it has been determined that locating the storing means 40 on the inlet chamber 10 provides a significant benefit because of the relatively low temperatures of the inlet housing 10. More specifically, this particular location for the storing means 40 improves the reliability of the electronic components associated with the storing means 40. Protecting these components from the potentially extreme temperatures associated with other portions of the auxiliary power unit therefore increases both the reliability and expected lifetime of those components.

As shown in the schematic illustration of FIG. 2, the engine control unit 44, or external device, is also connected in signal communication with one or more transducers. In FIG. 2, a plurality of transducers is illustrated. For example, temperature transducers 30 which are associated with a combustor 12, transducers for measuring the ambient temperature and pressure at the turbine inlet which are connected to the engine control unit 44 by signal lines 56 and 54, pressure and temperature transducers which are not connected to the turbine engine but which are disposed at positions for the purpose of measuring the environmental conditions surrounding the turbine engine as illustrated by boxes 60 and 64 and transducers which provide information relating to the aircraft itself as indicated by dashed box 70 and transducers 72 and 74 can be connected in signal communication with the engine control unit 44. Therefore, it should be understood that a plurality of transducers can be connected in signal communication with the engine control unit 44 for the purpose of providing information to the engine control unit 44 relating not only to the turbine engine directly but also to the environment surrounding the turbine engine and to the operating parameters of the aircraft on which the turbine engine is located. In addition, it can be seen in FIG. 2 that the engine control unit 44 is connectable in signal communication with the storing means 40 for the purpose of providing bi-directional information between the storing means 40 and the engine control unit 44. In operation, the engine control unit 44 receives signals from its associated transducers and stores information in the storing means 40 which is permanently attached to the turbine engine. A more specific discussion of the data storage technique, used in conjunction with a preferred embodiment of the present invention, will be described in greater detail below.

The primary advantage of the present invention is that it provides a means by which the engine data is permanently associated with the turbine engine regardless of whether or not the turbine engine or its associated components is replaced individually without replacement of the other associated components. For example, with reference to FIG. 2, if the engine control unit 44 is determined to be faulty, it would be removed from the aircraft and replaced with a new engine control unit. When the replacement engine control unit is installed in the aircraft, it would be connected, by signal line 78, to the existing storing means 40 and subsequent data collected by the engine control unit 44 would be stored in the storing means 40 along with, and in addition to, all of the historic data collected over the preceding portion of the lifetime of the turbine engine. Therefore, even though two or more individual engine control units are sequentially used in association with a specific turbine engine, the storage of data in the storing means is uninterrupted and is continuously maintained over the lifetime of the turbine engine. Similarly, if the turbine engine itself is determined to be faulty and in need of replacement, the turbine engine of the auxiliary power unit can be removed from the aircraft while the engine control unit 44 and all of its associated transducers remain in place in the aircraft. Following the substitution of a new turbine engine, the engine control unit 44 would be connected in signal communication with the new storing means 40 of the new turbine engine and all subsequent data monitored for storage by the engine control unit 44 can be stored in the storing means 40 of the new turbine engine. In accordance with the preferred embodiment of the present invention, each turbine engine would permanently carry a lifetime history of its operation along with the turbine engine itself, regardless of the aircraft on which the auxiliary power unit is installed and regardless of the engine control unit 44 with which the turbine engine is associated.

The importance of the improvement provided by the present invention can best be understood by considering an alternative situation in which the present invention is not utilized. If the storing means 40 were not permanently attached to the turbine engine but, instead, were included as an integral part of the engine control unit 44 itself, the stored data for the lifetime operation of the turbine engine would be lost if the engine control unit 44 were separated from the turbine engine. For example, if an engine control unit 44 and a turbine engine were associated together for a period of two years, a significant quantity of lifetime data on the turbine engine would be resident within the storing means of the engine control unit 44. Then, if the turbine engine were replaced while the engine control unit 44 remained in place in the aircraft, the data stored in the storing means of the engine control unit 44 would represent lifetime data for a turbine engine that no longer was associated with the aircraft or the engine control unit. A new turbine engine, after installation and connection to the engine control unit 44, would begin to provide data to the engine control unit 44 which would not be related to the historic data already stored in the engine control unit. Also, the turbine engine that was replaced in the above example would eventually be repaired and installed in another aircraft in association with another engine control unit 44. After this installation, the new engine control unit 44 would not have any historic data representing the two year portion of the lifetime of the turbine engine. These serious difficulties are avoided by the present invention because of the fact that the storing means 40 is disposed separately from the engine control unit 44 and is permanently attached to the turbine engine itself.

Figure 3:
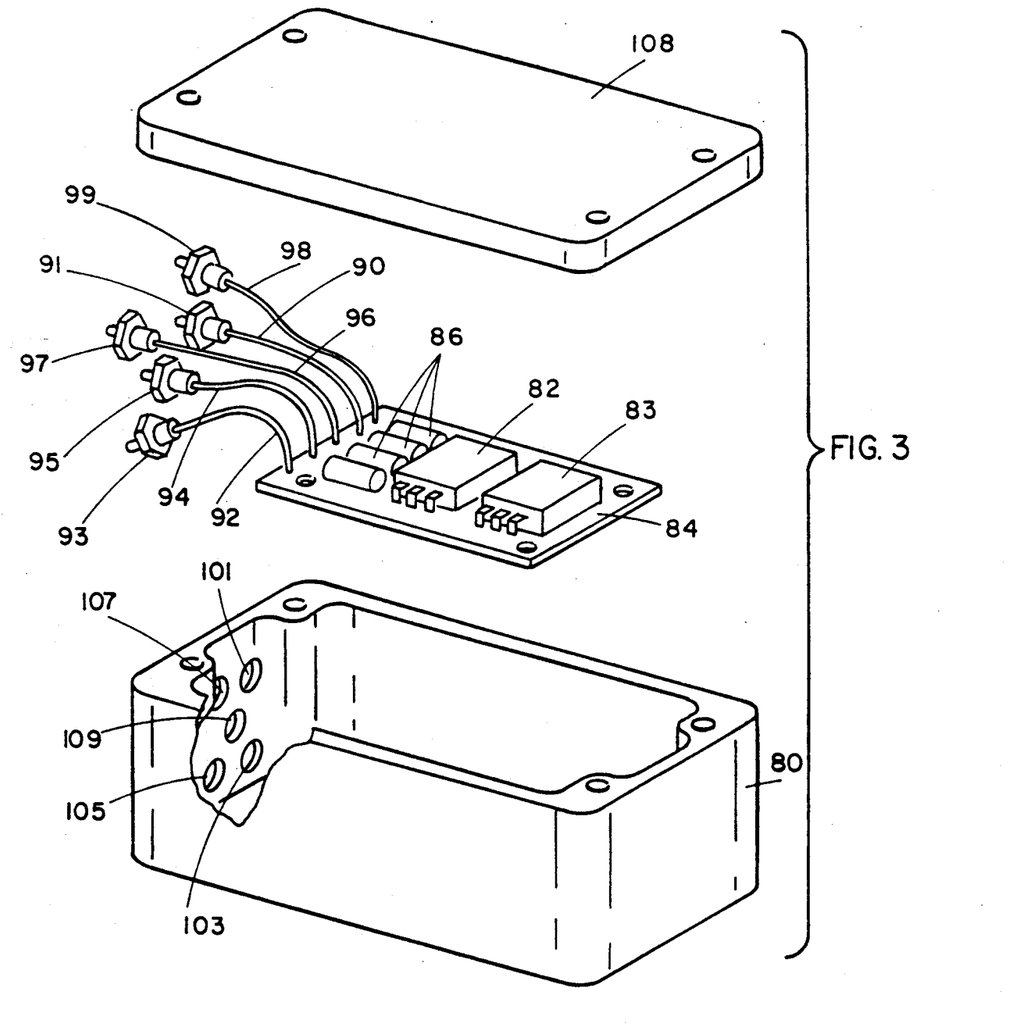
FIG. 3 shows an alternative embodiment of the present invention.

One alternative embodiment of the storing means 40 shown in FIG. 2 is illustrated in greater detail in FIG. 3.

A housing 80 is provided to contain a solid state memory device, such as an electrically erasable programmable read-only memory, or EEPROM 82, and an erasable programmable logic device, or EPLD 83. The EEPROM 82 and EPLD 83 are mounted on a circuit board 84 along with other electronic components such as those generally indicated by reference numeral 86. It should be understood that the illustration of the circuit board 84 and its associated components in FIG. 3 is exemplary and is shown only to illustrate the basic concept and general physical appearance of the present invention. The components of the circuit board 84 are provided with a means for connecting those components in signal communication with an external device. The connecting means shown in FIG. 3 comprises five leads, 90, 92, 94, 96 and 98, which provide signal communication between the components of the circuit board 84 and the outside portion of the housing 80. Each one of the leads is provided with a connector, 91, 93, 95, 97 and 99, which is disposed through openings in the housing 80. These five openings are indicated in FIG. 3 by reference numerals 101, 103, 105, 107 and 109. In this alternative embodiment of the present invention, it is anticipated that additional leads will be extended from the storing means 40 to the external device, such as the ECU 44. Those leads would be electrically connected to the connectors shown in FIG. 3 by some suitable means, such as soldering. After the circuit board 84 is arranged within the housing 80 and the connectors are disposed in the openings, a lid 108 is attached to provide an enclosure around the solid state memory device 82 and its associated components. The housing 80 is then permanently attached to the turbine engine. As discussed above, the use of this terminology relates to any means by which the storing means 40 can be attached to the turbine engine in such a way that removal from the turbine engine is discouraged. It is recognized that no attachment means is truly "permanent" in the sense that all possible techniques for removing it are absolutely prevented. However, the storing means, in the form of the housing 80 and its included components, is attached to the turbine by some means which provides a generally rigid attachment and, additionally, discourages easy removal. This attachment technique could include the bolting of the housing 80 to the inlet chamber 10 of the turbine engine, as shown in FIG. 2, or could include the welding of the housing 80 directly to a portion of the turbine engine. In fact, the housing 80 could possibly be included as a permanent portion of the turbine engine.

Figure 4:
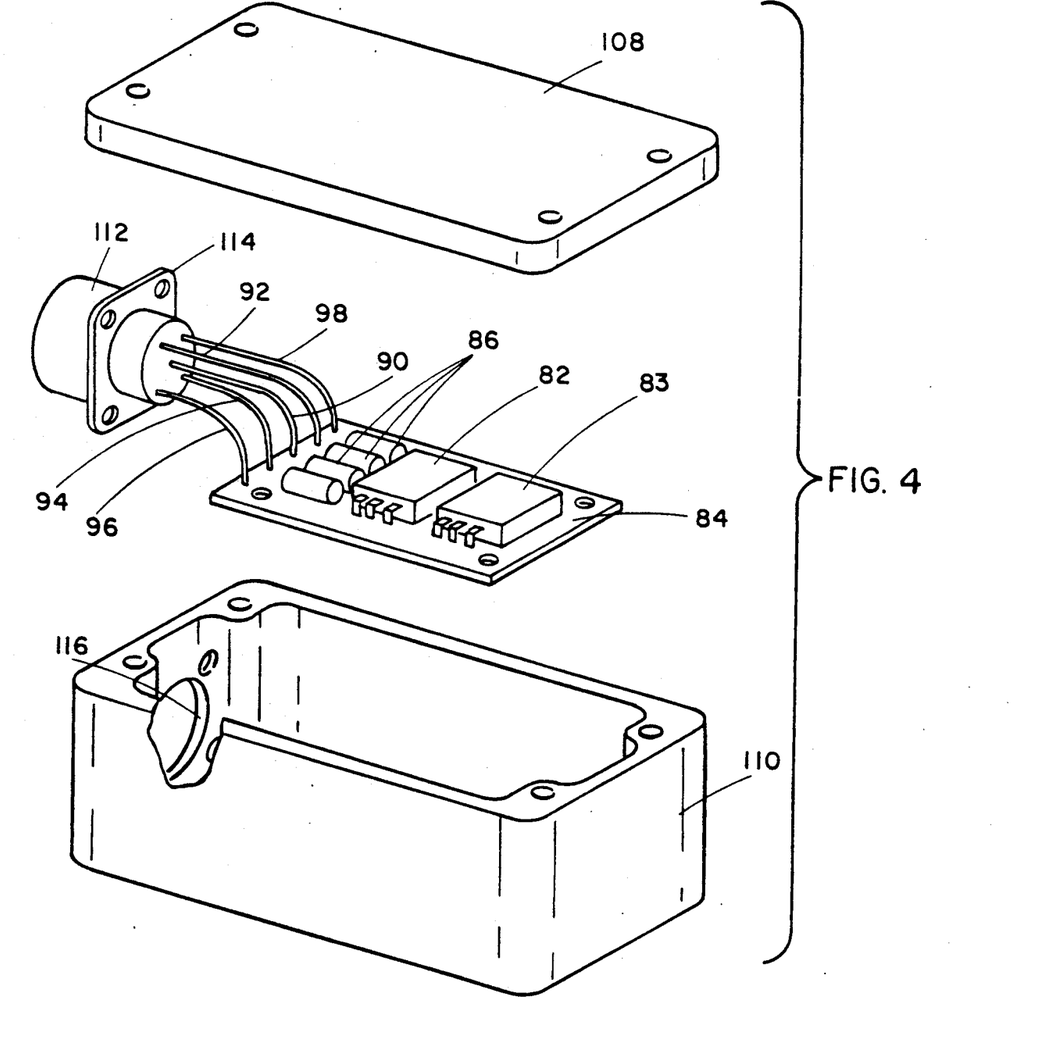
FIG. 4 shows another alternative embodiment of the present invention.

The alternative embodiment of the present invention shown in FIG. 4 is very similar to that shown in FIG. 3 with minor modifications made for a particular application. For example, the signal leads, 90, 92, 94, 96 and 98, are attached to a connector 112 which is mounted to a plate 114. The plate 114 is provided with holes which permits it to be firmly attached to the inside surface of one wall of a housing 110. That wall is provided with an opening 116 which is shaped to receive the connector 112 through the wall of the housing 110. This alternative embodiment of the present invention permits the storing means 44 to be constructed in such a way that it is easily connected to a set of signal lines extending from an external device, such as the engine control unit 44 shown in FIG. 2. The other components shown in FIG. 4 are functionally similar to those shown in FIG. 3. Although many different types of housings, such as housing 80 in FIG. 3 and housing 110 in FIG. 4, are available for these purposes, a particularly acceptable housing is one that is 1.5 inches by 1.5 inches by 2 inches and is made of aluminum. This type of housing is available from the Rose Corporation and provides a water tight aluminum enclosure for excellent protection of electrical, electronic or pneumatic components. This type of enclosure is used extensively in the measurement, control, marine, communications, computer and machine tool industries. Similarly, many types of connector 112 are available for the purpose described above. As an example, a wall mount receptacle designated by style number D38999 is available in commercial quantities from the Allied Bendix Amphenol Products Corporation. In addition, a connector which satisfies military specification MIL-T-55156/2A is suitable for these purposes.

Figure 5:
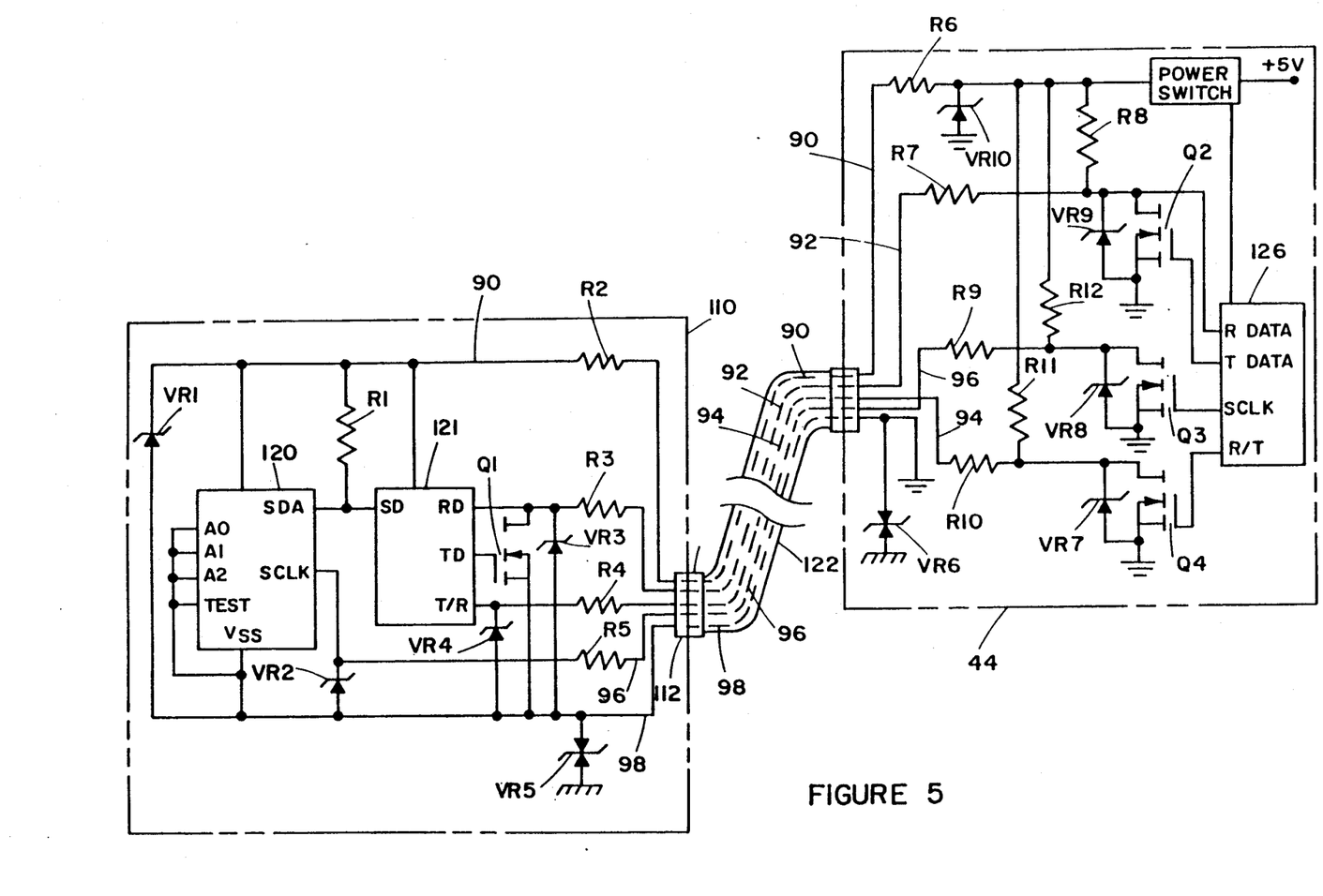
FIG. 5 is an electric schematic of the present invention.

FIG. 5 illustrates an electric schematic of the preferred embodiment of the present invention. A solid state memory device 120 provides a means for storing data relating to the operational history of the turbine engine. In a preferred embodiment of the present invention, the solid state memory device 120 is an electrically erasable programmable read-only memory, or EEPROM, such as style number X24C16M which is available in commercial quantities from the Xicor Corporation. It is a CMOS 16,384 bit serial EEPROM which is internally organized as eight 256×8 pages. It features a serial interface and software protocol allowing operation on a two wire bus. This EEPROM is designed and tested for applications requiring extended endurance. For example, data retention is specified to be greater than 100 years.

Its storage temperature range is from minus 65 degrees centigrade to plus 150 degrees centigrade and its operating range is from minus 55 degrees centigrade to plus 125 degrees centigrade. In FIG. 5, reference numeral 121 designates an erasable programmable logic device, or EPLD. This type of device is available in commercial quantities, as style number EP320 from the Altera Corporation. This device can accommodate up to 18 inputs and up to 8 outputs. The 20 pin, 300 mil package contains 8 macrocells each of which utilizes a programmable AND fixed OR structure. The EPLD programmable input/output architecture allows the EP320 user to configure output and feedback paths for combinatorial or registered operation, active high or active low. Using CMOS EPROM technology helps to make the device a zero power device at standby as well as allowing for an active power consumption of less than twenty percent of equivalent bipolar devices without sacrifice in speed performance.

A specific embodiment of the present invention is shown in FIG. 5 along with an exemplary circuit showing an implementation of an engine control unit 44. Although specific components are shown in FIG. 5 and will be described below, it should be understood that alternative configurations of the circuitry and alternative selection of components are to be considered within the scope of the present invention. The dashed line box shown to the left of FIG. 5 represents the present invention and, reference numeral 110 has been assigned to that dashed box. Comparing FIGS. 4 and 5, it can be seen that reference numeral 110 in FIG. 4 refers to the housing into which the electronic components of the present invention are disposed. Furthermore, although the circuit shown within the housing 110 in FIG. 5 is schematic in nature, the connector 112 is shown disposed within the housing 110 and creating an interface at the dashed line 110 for the purpose of providing a means for connecting the present invention to external devices.

The dashed line shown to the right of FIG. 5 represents a containment within which the engine control unit 44 and its related components are disposed. For the purpose of providing a means for understanding the flow of communication from the ECU 44 to the present invention, the five lines extending from the ECU 44 through the cable 122 to the connector 120 have been labeled with reference numerals 90, 92, 94, 96 and 98, within dashed box 110 and dashed box 44. The components sown in FIG. 5, for both the engine control unit 44 and the present invention, have been identified by reference numeral and described, by component type or value, in Table I.

TABLE I

| REFERENCE | COMPONENT TYPE OR VALUE |
| --- | --- |
| R1 | 6.8K Ohms |
| R2 | 20 Ohms |
| R3 | 2 Ohms |
| R4 | 20 Ohms |
| R5 | 20 Ohms |
| R6 | 20 Ohms |
| R7 | 2 Ohms |
| R8 | 75 Ohms |
| R9 | 20 Ohms |
| R10 | 20 Ohms |
| R11 | 75 Ohms |
| R12 | 75 Ohms |
| VR1 | TVS305 (Unitrode) |
| VR2 | TVS305 (Unitrode) |
| VR3 | TVS305 (Unitrode) |
| VR4 | TVS305 (Unitrode) |
| VR5 | JANTXIN6156A (Microsemi Corp) |
| VR6 | JANTXIN6156A (Microsemi Corp) |
| VR7 | TVS305 (Unitrode) |
| VR8 | TVS305 (Unitrode) |
| VR9 | TVS305 (Unitrode) |
| VR10 | TVS305 (Unitrode) |
| Q1 | 2N6901 (RCA) |
| Q2 | 2N6901 (RCA) |
| Q3 | 2N6901 (RCA) |
| Q4 | 2N6901 (RCA) |
| 120 | X24C16M (XICOR) |
| 121 | EP320 (Altera) |
| 126 | EP600 (Altera) |

Transistor Q1 acts as an output buffer for the present invention. It provides the necessary current drive to meet the rise and fall time requirements of the serial data bus while driving the capacitive loads created by the EMI and EMP suppression and harnessing. This also increases the output drive capability of the present invention, enabling it to drive harnesses of longer length. Transistor Q1 is only active when the EEPROM 120 of the present invention is transmitting data to the engine control unit. It should also be noted that the engine control unit 44 is provided with similar buffers Q2, Q3 and Q4 for reciprocal drive capability to the present invention from the engine control unit. The EPLD 121 provides the logic that is necessary to control the transistor buffer Q1 by using the T/R signal from the engine control unit 44 to disable transistor Q1 when the EEPROM 120 is not transmitting. The transistor Q1 is disabled into the OFF state when data is being received by the present invention from the engine control unit.

With specific reference to the EEPROM 120, the SDA port provides the connection for serial data input and output for the EEPROM. The SCLK port is the serial clock. With reference to the EPLD 121, the data input is at port RD which is gated through to the SD output when the transmit/receive, or T/R, signal is low. TD is the data output port from the EPLD 121 and follows the signal from the SDA port of the EEPROM 120 when the signal from T/R is high. The T/R signal is high when data is being transmitted from the EEPROM 120 and low when data is being received by the EEPROM 120.

In devices of the type shown in FIG. 5, it is sometimes important to provide electromagnetic interference, or EMI, and electromagnetic pulse, or EMP, protection for the circuitry. Although not specifically illustrated in FIG. 5, the following discussion will describe the relatively minor alterations required to provide these types of protection. With reference to the left side of FIG. 5, the EEPROM 120 and the EPLD 121 would be decoupled with a capacitor to provide additional EMI protection. More specifically, a capacitor would be connected between the five volt connection port of the EEPROM 120 and the ground port of the EEPROM 120. This capacitor would be a 0.1 microfarad capacitor such as the type designated by style number M39014/01-1553 which is available from the Sprague Corporation. This type of capacitor would be connected between the five volt port and the ground port for both the EEPROM 120 and the EPLD 121 of the present invention. In addition, further EMI protection can be provided by connecting a capacitor between the five volt supply and ground. These lines are designated by reference numerals 90 and 98 in FIG. 5 and, the capacitor would be a 6.8 microfarad capacitor such as the type identified by style number M39003/01-7108 which is available in commercial quantities from the Sprague Corporation.

Electromagnetic pulse protection is generally provided by the diodes VR1-VR10. Resistors R2-R5 and R6, R7, R9 and R10 provide current limiting during an electromagnetic pulse. The use of resistors R3 and R7 may be eliminated to improve signal levels on the serial data line with some reduction of EMP protection.

With continued reference to FIG. 5, it should be noted that the bipolar zener diodes, VR5 and VR6 are shown connected between the ground line of both the ECU 44 and the present invention and ground. It should be noted that the ground to which these bipolar zener diodes are connected is a chassis ground, whereas all of the other ground symbols shown in FIG. 5 actually refer to a connection between the related circuit point and a ground line, such as line 98. The illustration of the engine control unit 44 has been simplified by using the several ground symbols rather than showing each of these points connected to the ground line 98. Reference number 126 designates an erasable programmable logic device, or EPLD, which is available as style number EP600 from the Altera Corporation. With reference to the discussion of electromagnetic pulse protection, it should also be noted that the engine control unit 44 is provided with diodes VR7, VR8, VR9 and VR10 for these purposes.

While both the present invention and the engine control unit 44 have been described in detail and are illustrated with significant particularity in FIG. 5, it should be noted that the present invention relates to the components shown within the dashed box 110 and should not be considered to be limited by the specific structure shown in dashed box 44 of FIG. 5. The present invention is intended to be operable in conjunction with many different types of engine control units with circuitry changes being required only to make the present invention compatible with the specific engine control unit being used.

Although the data stored in the storing means of the present invention can take many alternative forms and comprise many varying types of data, a specific set of stored information will be described below to illustrate the preferred embodiment of the present invention. A counter variable representing the cumulative hours of operation of the turbine engine and a counter representing the cumulative number of starts of the turbine engine would be stored. In addition, other low cycle fatigue events would be cumulatively stored in another data location. These low cycle fatigue events would typically be, for example, the number of times that the engine was operated in an over temperature condition.

In addition, a fault history would be kept for the turbine engine. Typical faults would comprise over speed conditions, component failures and any other type of detectable failure that can be sensed by the engine control unit and its peripheral equipment, such as the plurality of transducers. At each occurrence of a fault condition, engine operating parameters are stored. These engine operating parameters are stored each time that a fault, a shut down or a periodic test occurs. These engine operating parameters would include, but are not limited to, the turbine engine speed, the exhaust gas temperature, the fuel setting, ambient temperatures and pressures, the compressor discharge pressure, the time required to accomplish the previous start sequence and the status of a plurality of discrete inputs and outputs that are monitored by the engine control unit. In addition, parameters that do not relate directly to the turbine engine but, instead, relate to the aircraft are stored. For example, the aircraft speed, or Mach number, the altitude of the aircraft and the date and actual time of the fault, shut down or periodic test. The purpose of this data storage is to record the magnitude of all important parameters that exists at the time of a fault condition. This data provides important information relating to the environment of the turbine engine, the specific operating situation of the various portions of the turbine engine and the instantaneous condition of the aircraft performance at the time of a fault condition.

In addition, certain record keeping and tracking information is stored. This information comprises the serial number of the turbine engine, configuration data describing the specific turbine engine and data relating to the engine control unit. As part of this data, an identification number may also be stored.

The present invention also makes possible the calculation of certain condition monitoring information. For example, normalized low cycle fatigue events and time/temperature accumulation information can be stored for the purpose of predicting proper maintenance times. For example, after a specified number of low cycle fatigue events or, alternatively, after a predetermined accumulation of time/temperature occurrences, statistical techniques can be used to develop a prediction which indicates the time when maintenance should be performed to prevent more serious faults from occurring in the future. In addition, a combined wheel life assessment can be determined based on the operational history of the turbine engine. Also, the time required to start the engine can be maintained over an extended period of time and trends can be determined which indicate that increased start times may predict the need for a maintenance overhaul. In fact, any performance degradation relating to the operation of the turbine engine can be monitored, stored and used to statistically predict trends which indicate the need for maintenance.

In a typical application of the present invention, the available memory of the EEPROM 120 would be divided into a plurality of data blocks. For example, one block would contain the permanent information relating to the turbine engine. This would include the identification code of the turbine engine and some configuration data relating to the engine. It is estimated that this block of information would require approximately ten data words of storage. In addition, another block of data would include information relating to accumulated hours of operation and accumulated starts of the engine. Since this type of information can be maintained with simple counter variables, a relatively small amount of data is sufficient to maintain this quasi-permanent information.

The majority of the remaining data storage capacity is primarily devoted to storing information relating to turbine engine faults. In each of these blocks of data, one word would be devoted to storing information describing the specific type of fault that occurred and another word would be used to store information relating to the sub-fault. For purposes of this discussion, a sub-fault is a more specific definition of a fault. For example, a fault may be identified as the failure of an engine control unit, or ECU, whereas the actual sub-fault could be a PROM check-sum failure within the engine control unit. In other words, for any given fault identifier there may be a vast plurality of sub-faults. In addition, approximately fifteen words of storage would be devoted to maintain a record of engine data that describes the condition of the turbine engine at the time the fault occurred. Approximately eight additional words in the block would be devoted to storing data relating to the aircraft condition when the fault occurred. The information relating to fault, sub-fault, engine data and aircraft data would be maintained in one block devoted to one fault condition. As described above, one fault storage block would require approximately twenty-five data words of memory. It is anticipated that many such fault blocks would be maintained and each block would be identified by a fault number. In other words, the most recent turbine engine fault would be identified as being the last recorded fault and each preceding fault would be similarly identified so that an order of fault conditions could be determined readily. In a preferred embodiment of the present invention, it is suggested that a data storage technique be utilized which minimizes the number of repeated data reds and data writes that must be used to maintain the historic data. This can easily be accomplished by a chaining of the fault data blocks with an index pointer indicating the location of the data block representing the most recent fault.

In addition, a portion of the memory in the EEPROM is devoted to life prediction data. This information, which is discussed above, relates to the statistical information maintained for the purpose of predicting a normalized life profile based on available information. In other words, the information could hypothetically store the time required during the last ten starts. Those times can be used to determine if a trend exists which results in successively longer start times. In addition, time/temperature information can be stored. For example, the number of accumulated minutes that the engine operated over a predetermined temperature magnitude can be stored to predict the need for maintenance.

It is important to understand that all of the information described above is exemplary and used to illustrate a preferred embodiment of the present invention. Other types of data can be stored in the storing means and, furthermore, all of the types of data described above need not be stored for all applications of the present invention. The specific type of data stored is not as important as the basic concept of the present invention which places the storing means in permanent association with the turbine engine regardless of whether the turbine engine is replaced and associated with a new engine control unit in another aircraft. The present invention maintains a permanent physical relationship between the turbine engine and its stored lifetime data. The permanent attachment of the storing means to the turbine engine permits the stored information to travel with the turbine engine regardless of how or when the turbine engine is moved from aircraft to aircraft or associated with different engine control units. The most important feature of the present invention is that it permits data to be created by a remote device, such as the engine control unit, and written from the remote device to the storing means. In addition, the present invention permits information to be read from the storing means by the remote device.

Figure 6:
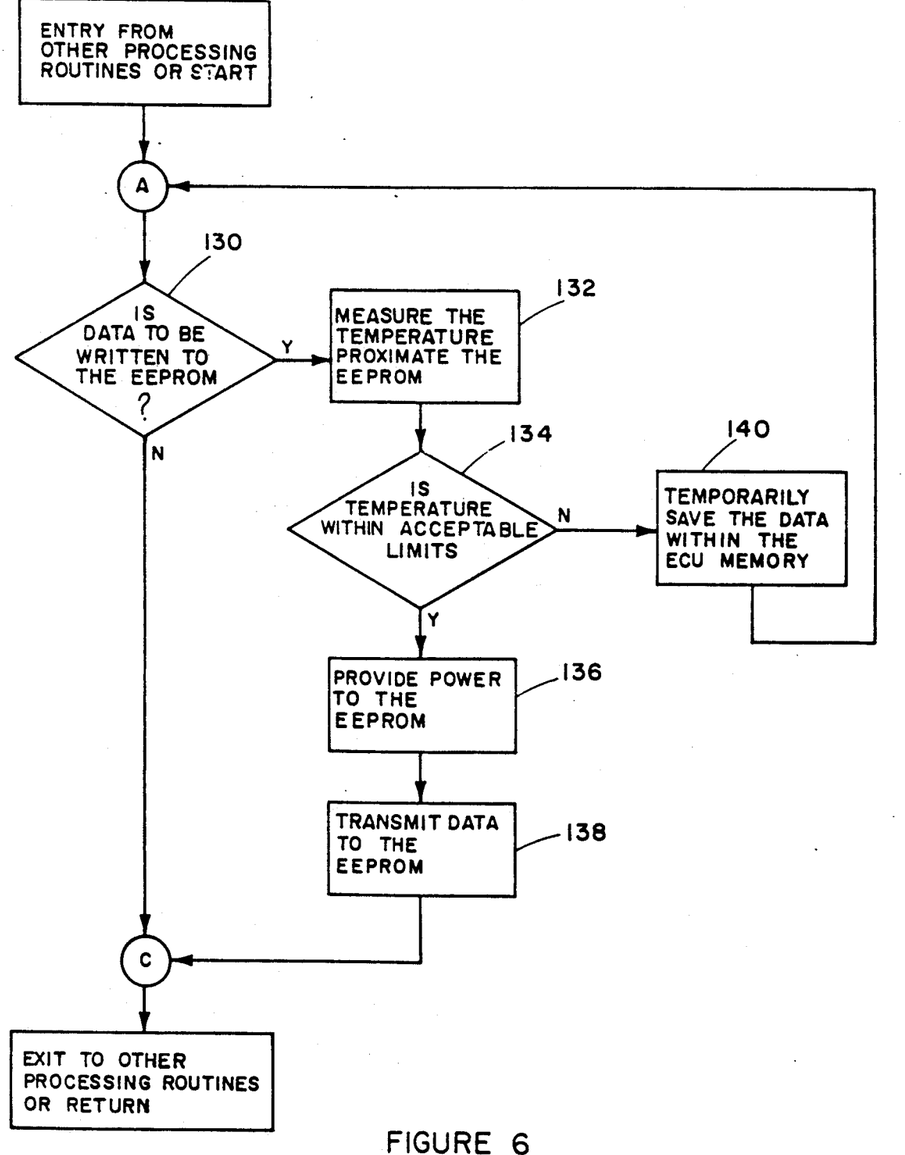
FIG. 6 illustrates an exemplary flow chart of the logic within the engine control unit that is followed prior to transmitting data to the storing means in a preferred embodiment of the present invention.

The present invention displaces the engine control unit spatially away from the storing means. This arrangement disposes the engine control unit at a location which is protected from the relatively harsh environment surrounding the turbine engine. Since the storing means is permanently attached to the turbine engine, the environment immediately surrounding the storing means can possibly exceed the permissible operating environment of the solid state components contained within the present invention. For this reason, the engine control unit is programmed to interrogate the transducers in the region of the storing means and, if the temperature proximate the storing means exceeds the allowed operating temperature of the solid state components, no power will be connected to the storing means until this condition is alleviated. FIG. 6 shows an exemplary flow chart that represents the logic performed by the microprocessor within the engine control unit. It should be understood that the flow chart shown in FIG. 6 is a simplified flow chart to illustrate the basic logical concept performed by the engine control unit before each read or right operation involving the EEPROM of the storing means. Beginning at point A the engine control unit determines whether or not a requirement exists for data to be written to the EEPROM. This is represented by the decision block 130. If data is to be written to the EEPROM, the engine control unit causes a measurement to be read from the transducer most proximate the EEPROM otherwise, processing continues at point C. This is indicated by block 132 of the flow chart. After the temperature measurement is obtained, the engine control unit compares that measured temperature to a predetermined set of limits to determine whether or not the temperature proximate the EEPROM is acceptable for the EEPROM to be provided with electrical power. This comparison is illustrated by decision block 134. If the temperature in the region proximate the EEPROM is acceptable, the engine control unit provides electrical power to the EEPROM, as indicated by block 136, and then proceeds to transmit the data to the EEPROM for storage within the storing means of the present invention. This transmission is represented by block 138 of the flow chart in FIG. 6. Then, as indicated by point C in the flow chart, the engine control unit continues to perform its normal duties.

If the engine control unit determines that the measured temperature is not within acceptable limits for providing power to the EEPROM and transmitting data to it, at the decision block 134 of the flow chart, the program proceeds to block 140 and the data is temporarily saved within the engine control unit memory. This is indicated by block 140 of the flow chart. After a predetermined period of time, the engine control unit returns to point A of the flow chart to repeat the logical steps described above. The temperature is continually read and compared to acceptable limits until, eventually, the temperature proximate the EEPROM is determined to be acceptable. The procedure illustrated by the flow chart in FIG. 6 prevents the EEPROM from being provided with electrical power and operated under conditions which are not within its normal operating range. This procedure prevents damage from occurring to the EEPROM.

Although the present invention has been described with considerable detail and has been illustrated in a specific manner relating to the preferred embodiment of the present invention, it should be understood that other adaptations of the basic concepts described above are within the scope of the present invention.

What we claim is:

1. An engine monitoring system, comprising:
means for storing data, said storing means being attached to said engine; and
means for connecting said storing means in signal communication with an external device for the purpose of receiving information from said external device relating to the operation of said engine and storing said information in said storing means, said external device connected in signal communication with said connecting means, said connecting means providing a communication link between said external device and said external device and said storing means for transmitting said information from said external device to said storing means, said connecting means being connected in signal communication with said storing means, said external device being spatially displaced from said engine and said storing means, means for measuring an operating parameter of said engine, said measuring means being connected in signal communication with said external device, and said external device comprising a controller that is programmed to deactivate said storing means when said external device is neither transmitting signals to said storing means nor receiving signals from said storing means.

2. The system of claim 1, wherein:
said connecting means is a serial communication link.

3. The system of claim 1, wherein:
said storing means comprises an EEPROM.

4. The system of claim 1, wherein:
said storing means comprises an erasable programmable logic device.

5. The system of claim 1, wherein:
said external device comprises a controller that is programmed to determine the acceptability of the environmental conditions of said storing means before connecting said storing means to a source of power.

6. The system of claim 1, wherein:
said engine is a turbine engine.

7. The system of claim 1, further comprising:
means for protecting said storing means from electromagnetic interference.

8. An engine monitoring system, comprising:
means for storing data, said storing means being permanently attached to said engine;
an external device disposed at a location which is spatially displaced from said engine and said storing means;
means for connecting said external device in signal communication with said storing means for the transmission of data from said external device to said storing means and for the storage of data in said storing means,
means for measuring an operating parameter of said engine, said measuring means being connected in signal communication with said external device, and said external device comprising a controller that is programmed to control the connection of power to said storing means, 9. The system of claim 8, wherein:
said connecting means is a serial data link.

10. The system of claim 8, wherein:
said storing means comprises an EEPROM.

11. The system of claim 8, wherein:
said storing means comprises an erasable programmable logic device (EPLD).

12. The system of claim 8, further comprising:
means for protecting said storing means from electromagnetic interference.

13. An engine monitoring system, comprising: an engine;
a solid state memory device permanently attached to said engine;
means for connecting said memory device in signal communication with an external device for bidirectional data transfer between said external device and said memory device, said external device being spatially displaced from said engine; and
means for measuring a parameter relating to the operating of said engine, said measuring means being connectable in signal communication with said external device,
said external device connected signal communication with said storing means and with said measuring means,
said memory device being configured to store data relating to said parameter measured during the operation of said engine,
said external device comprising a controller configured to store data relating to operational faults of said engine in said memory device,
said memory device being an EPROM,
said measuring means comprising a plurality of transducers,
said controller being configured to control the connection of electrical power to said memory device as a function of the magnitude of a preselected parameter measured by a preselected one of said plurality of transducers,
said preselected parameter is temperature, and
said connecting means comprising a serial communications link.

14. The system of claim 13, further comprising:
means for protecting said memory device from electromagnetic pulses.

15. The system of claim 13, further comprising:
means for protecting said memory device from electromagnetic interference.

* * * * *